United States Patent [19]

Emery

[11] Patent Number: 5,292,166
[45] Date of Patent: Mar. 8, 1994

[54] VEHICLE HOOD PROTECTIVE SHIELD

[76] Inventor: Richard H. Emery, 725 Miami Ave., Terrace Park, Ohio 45174

[21] Appl. No.: 35,198

[22] Filed: Mar. 22, 1993

[51] Int. Cl.$^5$ .............................................. B62D 35/00
[52] U.S. Cl. .................................. 296/91; 296/180.5
[58] Field of Search ................................ 296/91, 180.5

[56] References Cited

U.S. PATENT DOCUMENTS

| | | |
|---|---|---|
| 2,872,242 | 2/1959 | Whartman et al. . |
| 3,022,848 | 2/1962 | Heiser ................................ 296/91 X |
| 3,817,572 | 6/1974 | Francis . |
| 4,776,627 | 10/1988 | Hutto et al. . |
| 5,039,156 | 8/1991 | Messmore et al. . |
| 5,094,497 | 5/1992 | Hartung et al. ........................ 296/91 |
| 5,112,095 | 5/1992 | Lind et al. ............................ 296/91 |

Primary Examiner—Joseph D. Pape
Attorney, Agent, or Firm—Charles R. Wilson

[57] ABSTRACT

A hood protective shield for use on a front portion of a motor vehicle's hood protects against insects and road debris damage. The shield comprises a main body member, a lip member extending therefrom and a set of spacers attached to the underside of the main body member. The main body member is shaped to fit the contour of the front portion of the hood and extends laterally substantially fully across the hood and extends longitudinally partially from a front edge thereof. The lip member wraps around the edge of the hood to engage an underside of the hood and hold the shield in a semi-permanent, though secure fashion to the hood.

22 Claims, 3 Drawing Sheets

VEHICLE HOOD PROTECTIVE SHIELD

This invention relates to a protective shield. More particularly, the invention relates to a protective shield adapted for semi-permanent attachment to the hood of a motor vehicle to deflect insects and road debris.

BACKGROUND OF THE INVENTION

Many owners of motor vehicles are concerned about the appearance of their vehicle. This is very true of owners of new autos and owners of more exclusive autos. A problem particularly of concern is paint finish scratching or marring. Even small scratches or chips in the finish of the auto can materially detract from its appearance and significantly reduce its value. An auto's paint finish can be impaired by an accidental bumping from another auto's door being carelessly opened as often occurs in a public parking lot or by insects or road debris thrown against the auto during travel. The latter is a cause of paint finish scratching, chipping and marring. It is most likely to occur at the front portion of the auto's hood. There is no practical way to avoid the damage. Furthermore, it is difficult to repair a small damaged area. The whole hood most likely will have to be repaired and/or repainted.

Various articles have been developed for use on auto hoods to protect them from insects and road debris damage. U.S. Pat. Nos. 2,872,242, 3,022,848, 3,817,572 and 5,039,156 disclose articles which are designed to fit on the front portion of an auto's hood. All suffer in one way or another. Certain of the known articles are unattractive, per se, and actually detract from the auto's appearance. The insect deflector article of U.S. Pat. No. 2,872,242 for example extends vertically from the hood a very noticeable distance. While most likely effective, most auto owners would rather risk the paint finish damage and its consequence appearance detraction than mount the rather bulky article in so conspicuous a location as the hood. Ideally, any protective article for the hood will be noticed only upon close inspection.

All known hood protective articles also appear to be difficult to mount and demount as the need arises. For example, there are times when the auto owner is not particularly concerned with insects and road debris. Thus, low speed driving is less likely to cause a problem. The auto owner may want to remove any hood protective shield at such time. There are other times when paint damage is much more likely to occur. Ideally, any hood protective shield will be readily mounted and demounted as need dictates. It is particularly important that any mounting means be secure, yet be semi-permanent in nature. Most importantly, no physical alteration of the auto should be needed to install the shield. This generally means that no external attaching means such as screws or bolts and nuts be used in the installation.

In accord with a long felt need experienced by many auto owners, there has now been developed a hood protective shield for use on a motor vehicle. The shield is virtually unnoticeable and does not detract from the vehicle's appearance. It is mounted to the hood of the vehicle in a semi-permanent, though secure fashion.

SUMMARY OF THE INVENTION

A hood protective shield for use on a front portion of a motor vehicle hood comprises a main body member shaped to fit the contour of a front portion of the hood and dimensioned to extend substantially laterally across the hood and to extend longitudinally from a front edge of the hood to about four to eighteen inches therefrom. A lip member extends from the main body member to wrap around the front edge of the hood and engage an underside of the hood. The shield also has a set of spacers attached to an underside of the main body member to hold the shield off the hood so as to create a shock-absorbing air gap cushion area and to provide a flow path for rain water. The lip member and, in a preferred embodiment of the invention, optional restraining straps extending from each lateral edge of the main body member hold the shield to the hood in a semi-permanent, but secure manner without a need for hood alteration or a concern for hood damage.

DETAILED DESCRIPTION OF THE INVENTION

The hood protective shield of the invention is described in particularity with reference to the drawings and its use on an auto. It should be understood the shield can be shaped and dimensioned to fit all makes and models of autos as well as other motor vehicles, including vans and trucks.

Figure 1:
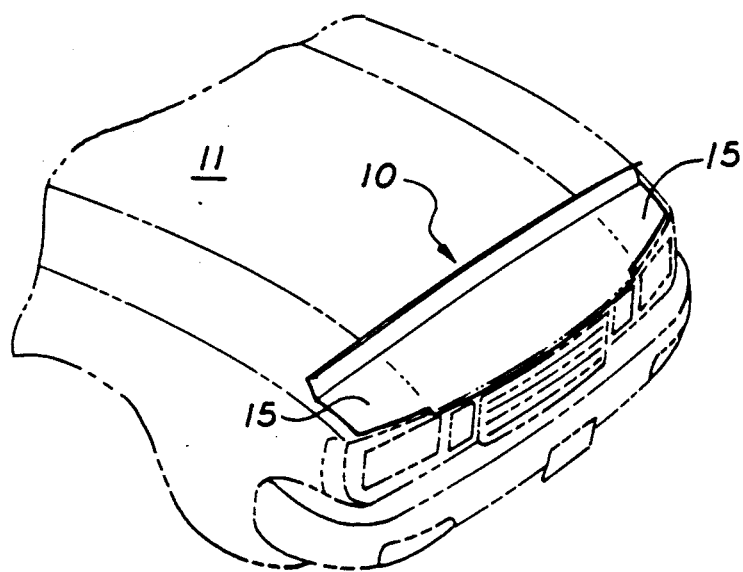
FIG. 1 is an environmental view in perspective of the hood protective shield of the invention semi-permanently mounted on a hood of an auto.

With reference to FIG. 1 there is shown a hood protective shield 10 of the invention secured to the front portion of an auto's hood 11. As better seen in FIGS. 2-4, the shield 10 comprises as its essential components, a main body member 12, a lip member 13 extending from the main body member and wrapping around a front edge of the hood to engage an underside of the hood and a set of spacers 14 positioned on the underside of the main body member. The hood protective shield 10 is shaped and dimensioned to fit the contour of the front portion of the hood on which it is to be used. Autos tend to have hoods that are generally the same, though all are unique because of their precise shape and dimension. Accordingly, the hood protective shield of the invention is manufactured in strict accordance with the particular hood where it will be used and is marketed as such.

The shield 10 of FIG. 1 is transparent so as to be as inconspicuous as possible on the hood. It can as well be tinted a shade approximating or at least compatible with the color of the auto, though generally is not because of the wide range of auto colors and consequent need for a large inventory of products. Most importantly, the hood protective shield 10 appears to be a part of the auto, not an article which will detract from the appearance of the vehicle itself.

At least the main body member 12 of the hood protective shield 10 is made of a durable scratch-resistant rigid or semi-rigid material. A synthetic polymeric resin such as polyvinylchloride, polyester or polycarbonate is preferred. Preferably, the main body member and the lip member are made of the same material and are made as one piece by a thermoforming, vacuum forming or injection molding process. Other materials and manufacturing processes can be used. The shield 10 must be sufficiently durable and scratch-resistant to withstand the spattering of insects and road debris such as gravel which is normally encountered by all motorists.

The shield, exclusive of the spacers, is about fifteen mil to about two hundred fifty mil in thickness. Generally, the thinner gauge shields of from about fifteen mil to about fifty mil are preferred because of a raw materials savings in manufacture and because of a resultant lighter product easier to handle. It has been found that sufficient resistance is provided by the thinner gauge shields because of the spacers under the main body member and consequent shock-absorbing air gap cushion area as further discussed below.

The main body member 12 of the shield 10 extends laterally substantially fully across the hood. Preferably, the width of the main body member is substantially equal to the width of the front portion of the hood for full protection of this part of the hood. As evident in FIGS. 1, 3 and 4 a set of optional wings 15 (defined by broken lines in FIGS. 3 and 4 where each meets the main body member) extend laterally from each side of the main body member 12 sufficiently to cover at least a major portion of the auto's front fender area. Understandably, this portion of the vehicle is also subjected to impact by the insects and road debris and ideally is protected as well. The main body member 12 extends longitudinally from a front edge of the hood to about four inches to about eighteen inches therefrom, preferably from about six inches to about twelve inches therefrom. It has been found that the vertical portion found on the front of the hood and a relatively short distance back towards the auto's windshield is most susceptible to paint finish damage. The main body member can extend even further back along the hood for added protection though is not preferred because of the lessen likelihood of damage to this area of the hood and because of appearance detraction reasons.

The lip member 13 which extends from the main body member 12 of the shield 10 is for the purpose of securely holding the shield to the hood. The shield must be securely held in place during high speed travel, travel over uneven roads and travel under all kinds of adverse weather conditions including temperature extremes, rain, snow, etc. At the same time, the shield must be secured in a manner which is semi-permanent in nature and does not damage the hood.

Figure 2:
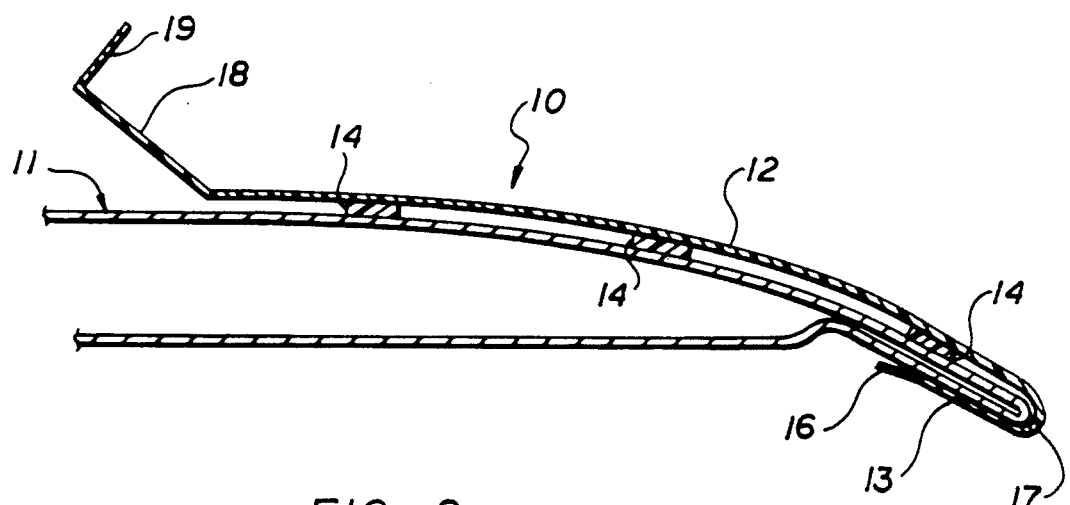
FIG. 2 is a side view in section of the hood protective shield of FIG. 1 as shown mounted on the hood.
Figure 3:
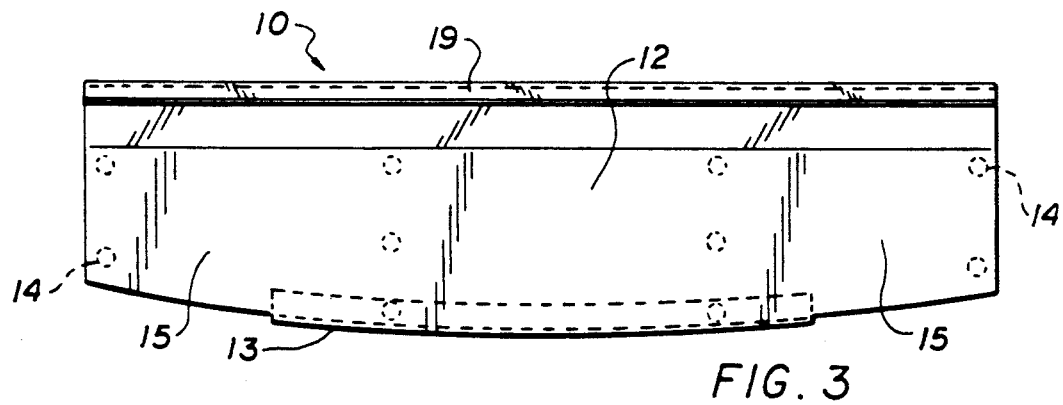
FIG. 3 is a top view of the hood protective shield of FIG. 1.

With reference to FIG. 2, it can be seen that the lip member 13 extends from the main body member substantially along its full length and wraps around the hood to engage an underside of the hood. It is generally J-shaped with a curved leg portion engaging the front edge of the hood and a substantially straight leg portion extending a sufficient distance along the underside of the hood to provide a secure fit. A straight leg portion of from about one inch to about four inches is normally sufficient to provide the secure fit needed. Necessarily, the lip member 13 is also contoured to fit the particular hood of the vehicle the shield is produced for. As shown in FIGS. 1-4, the lip member 13 extends laterally the full length of the main body member 12. An outwardly flared terminus 16 at the end of the leg of the lip member is preferably provided as an aid to installing and removing the shield from the hood.

A set of spacers 14 is also provided on an underside of the main body member 12 and the wings 15 of the shield 10. The spacers ensure that the main body member and wings do not sit flush on the hood and fenders. Constructing the shield so that the main body member and optional wings sit off the auto, preferably from about one-sixteenth inch to about one-half inch provides a shock-absorbing air gap cushion area. This cushion area is needed to better absorb forces from any larger road debris such as a rock hitting the shield especially at high speeds of travel. It also allows the shield to be made from a relatively thin gauge material. That is, the thin gauge material coupled with the cushion area provide resistance against road debris damage equivalent to a shield made from a much heavier gauge material which sits directly on the hood. The cushion area additionally ensures that water can drain or evaporate from this portion of the hood, i.e. it is not trapped where it can cause rust or other paint finish marring.

Figure 4:
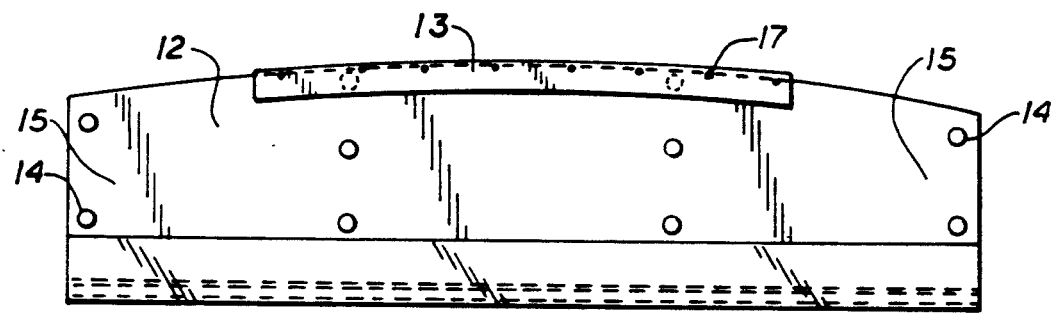
FIG. 4 is a bottom view of the hood protective shield of FIG. 1.

The spacers 14 are made of any soft and preferably resilient material, including a synthetic polymeric solid material, a synthetic polymeric foam, and a natural or synthetic rubber. The exact number and precise placement of the spacers 14 are not critical. The spacers 14 are substantially uniformly spaced for appearance purposes. This also has the effect of ensuring a continuous air gap cushion area under the main body member of the shield. Generally, spacers at about twelve inches to about eighteen inches on center location is sufficient. As illustrated in FIG. 4, two spacers are in a central location and the balance of the spacers are staggered along the peripheral edges of the main body member and the wings. They are permanently attached to the underside of the main body member and wings.

When the lip member of the shield extends fully laterally across the main body member as shown in FIGS. 1-4, several rain holes 17 are provided in the lip member at or near where it meets the main body member. Preferably, the rain holes are provided in the curved leg of the lip member at its lowest point. The rain holes provide a means for water which may collect under the main body member to drain. The holes 17 are substantially uniformly spaced along the lip member and have a diameter to allow the water to readily drain without affecting the structural integrity of the hood protective shield 10.

A trailing air foil member 18 of the hood protective shield 10 is optionally provided to further protect the auto's paint finish from insects and road debris damage. The air foil member 18 extends generally vertically from the rearward edge of the main body member 12 and stretches the width thereof. A catch ledge 19 sloping forwardly from the air foil member 18 and away from the windshield can be formed if desired to further prevent road debris from hitting the auto's windshield. Any road debris in particular that hits the main body member as the auto travels down the road will be forced back to where it hits the air foil member. It is caught there and can be removed when the vehicle is stopped. The air foil member typically rises up to about four inches, preferably one inch to about three inches from the main body member.

Figure 5:
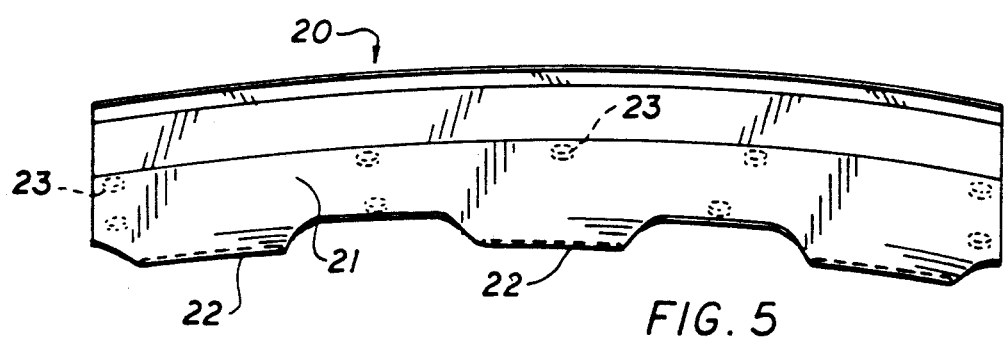
FIG. 5 is a top view of another hood protective shield of the invention showing a set of lip members to hold the shield in place during use.
Figure 6:
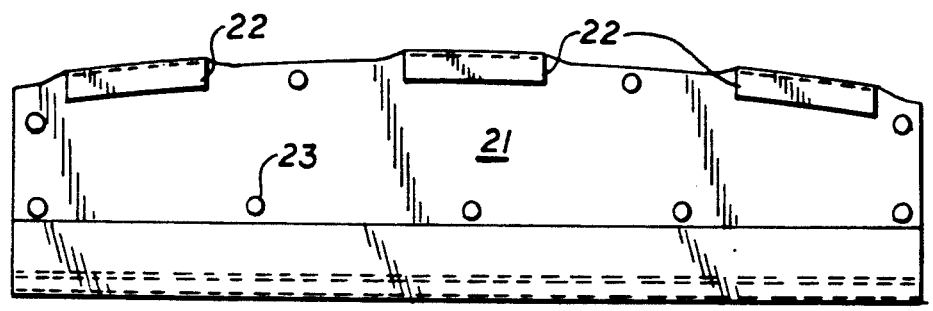
FIG. 6 is a bottom view of the hood protective shield of FIG. 5.

FIGS. 5 and 6 illustrate another embodiment of the invention. The hood protective shield 20 has a main body member 21 similar in all respects to the main body member 12 of FIGS. 1-4. However, a set of lip members 22 extends from the main body member 21 and wrap around the front edge of the hood to engage an underside of the hood to hold the shield 20 in place during use. Each lip member 22 is generally J-shaped and is from about two inches to about six inches in width. A leg of the lip member extends from about one inch to six inches back under the hood. At least two, preferably from three to six of the lip members 22 substantially equi-spaced along the main body member are used to provide the degree of attaching force needed. The separate lip members of this embodiment of the invention allow rain water to freely flow and ensures against dead air space with heat build-up under the main body member of the shield from occurring.

The spacers 23 found on the underside of the main body member 21 of the hood protective shield 20 serve the same function as the spacers 14 on the shield 10 above described. Their placement and materials of construction can be the same. No wings are provided on the shield 20 depicted so that only the hood of the auto is protected.

Figure 7:
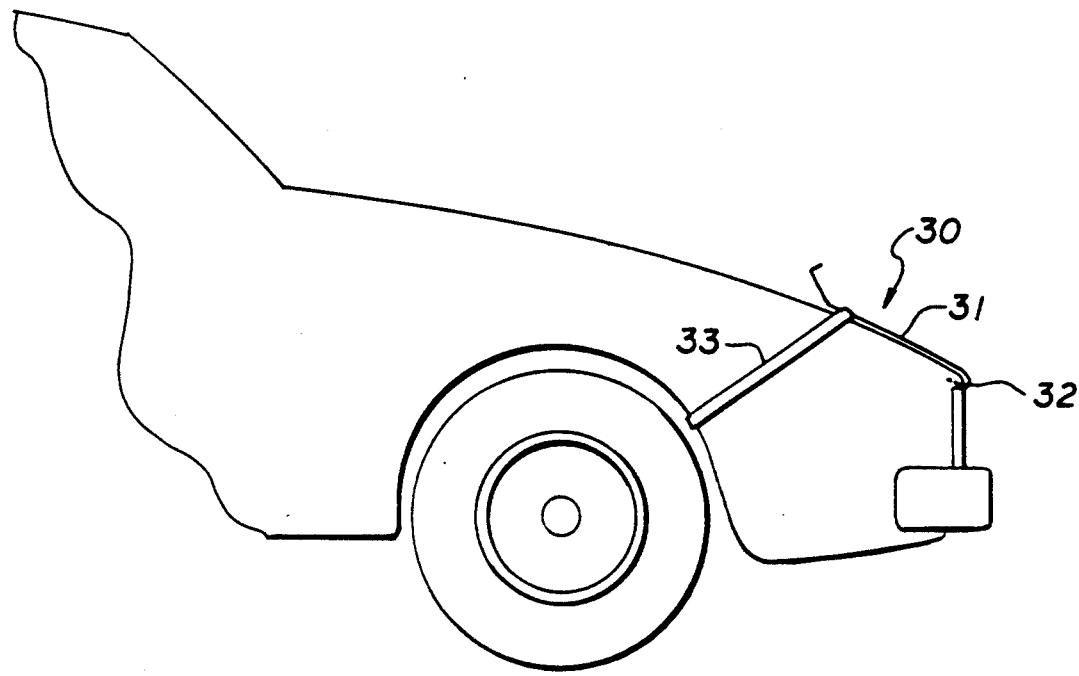
FIG. 7 is a side view of an alternative hood protective shield of the invention wherein a set of restraining straps are used to more securely hold the shield to the auto.
Figure 8:
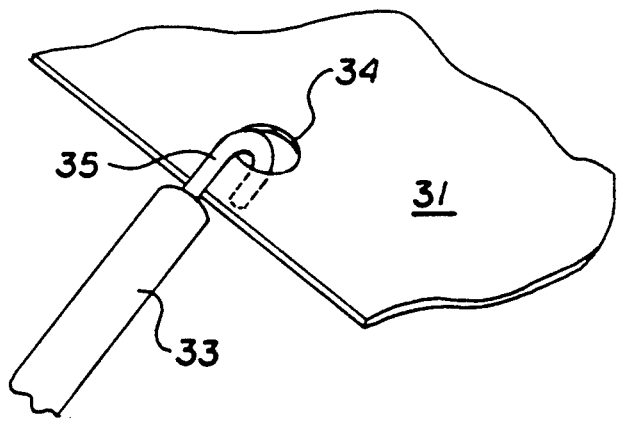
FIG. 8 is a partial side view showing in detail a restraining strap attachment used on the shield of FIG. 7.

With reference to FIGS. 7 and 8, a hood protective shield 30 with an optional restraining strap is shown. A main body member 31 and a lip member 32 are constructed as above described with reference to FIGS. 1-4. However, two restraining straps 33 are used on the shield 30 to better hold it to the hood. Each strap 33 extends from near a lateral edge of the shield to a structural part of the auto conducive to holding an attachment means found on a second end of the strap 33. Preferably, the strap extends to a structural part under the hood so as to be more inconspicuous, though can as well lead to an external structural part as shown in FIG. 7.

As best seen in FIG. 8, a lateral edge of the main body member 31 is provided with a hole 34 and the strap 33 has a hook-like attaching means 35 extending from an end and dimensioned to extend partially into the hole. The restraining strap 33 also has a similar hook-like attaching means of its opposite end and is intended to engage an edge of the vehicle's wheel well. The strap is ideally elastic to allow for easy engagement and disengagement of the strap from the vehicle, yet also provide a secure attaching means. While not required, it has been found the two restraining straps are favored by some motorists because of the supplemental attaching force they are able to add to the lip member of the shield.

In use, the hood protective shield of the invention intended for the particular make and model of the motor vehicle is positioned near the front edge of the hood as opened. The shield is simply pushed back onto the front portion of the hood until the curved portion of the lip member abuts against the hood's front edge. The hood is now closed. Any optional restraining strap is attached at each of its ends. The vehicle is ready for the open road with the owner feeling assured the likelihood of insects and road debris damage to the vehicle's paint has been greatly diminished. After any trip has been completed, the owner can if he so desires simply reverse the installation steps and store the hood protective shield until needed.

The invention has been described in detail above with particular reference to the drawings. It should be understood various modifications and changes of an obvious nature can be made. All such variations are considered within the scope of the invention as embodied in the appended claims.

I claim:

1. A hood protective shield capable of semi-permanent attachment to the hood of a motor vehicle for deflecting insects and road debris thrown towards the hood during travel, said protective shield comprising:
    (a) a main body member of durable scratch-resistant material shaped to fit the contour of a front portion of the hood and dimensioned to extend substantially laterally across the hood and longitudinally from a front edge thereof to about four inches to about eighteen inches therefrom and a lip member extending substantially fully across the main body member and extending from the main body member to wrap around the front edge of the hood to engage an underside of said hood to snugly hold the protective shield article to the hood, and further having a set of drain holes where said lip member and said main body member meet; and
    (b) a set of spacers attached to an underside of the main body member to hold said main body member off the hood so as to create a shock absorbing air gap cushion area and to provide a flow path for rain water to drain from the hood.

2. The hood protective shield of claim 1 wherein the lip member is J-shaped with a curved leg portion which engages the front edge of the hood and a substantially straight leg portion which extends along the underside of the hood from about one inch to about four inches.

3. The hood protective shield of claim 2 wherein the substantially straight leg portion of the J-shaped leg member further has an outwardly flared terminus to aid in installing and removing the shield from the motor vehicle.

4. The hood protective article of claim 1 further comprising a set of wings, each said wing extending laterally from the main body member to cover a front portion of a fender of the motor vehicle.

5. The hood protective shield of claim 1 further comprising a pair of restraining straps, each restraining strap attached at one end to the main body member near a lateral edge and having sufficient length to extend to a structural part of the motor vehicle and having means to attach thereto.

6. The hood protective shield of claim 1 wherein the shield is from about fifteen mil to about fifty mil in thickness.

7. The hood protective shield of claim 1 wherein the spacers are made of a soft resilient material.

8. The hood protective shield of claim 7 wherein the spacers are attached to the underside of the main body member at about twelve inches to about eighteen inches on center locations.

9. A hood protective shield capable of semi-permanent attachment to the hood of a motor vehicle for deflecting insects and road debris thrown towards the hood during travel, said protective shield comprising:
    (a) a main body member of durable scratch-resistant material shaped to fit the contour of a front portion of the hood and dimensioned to extend substantially laterally across the hood and longitudinally from a front edge thereof to about four inches to about eighteen inches therefrom and having at least two lip members extending from the main body member to wrap around the front edge of the hood to engage an underside of said hood to snugly hold the protective shield article to the hood, each said lip member being from about two inches to about six inches in width and extending along the underside of the hood from about one inch to about six inches; and (b) a set of spacers attached to an underside of the main body member to hold said main body member off the hood so as to create a shock absorbing air gap cushion area and to provide a flow path for rain water to drain from the hood.

10. The hood protective shield of claim 9 wherein the main body member has from three to six lip members substantially equi-spaced along said main body member and extending therefrom.

11. The hood protective shield of claim 9 further comprising a trailing air foil member extending substantially vertically from a rearward edge of the main body member.

12. The hood protective article of claim 9 further comprising a set of wings, each said wing extending laterally from the main body member to cover a front portion of a fender of the motor vehicle.

13. The hood protective shield of claim 9 wherein the spacers are made of a soft resilient material.

14. The hood protective shield of claim 13 wherein the spacer are attached to the underside of the main body member at about twelve inches to about eighteen inches on center locations.

15. A hood protective shield capable of semi-permanent attachment to the hood of a motor vehicle for deflecting insects and road debris thrown towards the hood during travel, said protective shield comprising:

(a) a main body member of durable scratch-resistant material shaped to fit the contour of a front portion of the hood and dimensioned to extend substantially laterally across the hood and longitudinally from a front edge thereof to about four inches to about eighteen inches therefrom, said main body member having a lip member extending therefrom to wrap around the front edge of the hood to engage an underside of said hood to snugly hold the protective shield article to the hood and further having a trailing air foil member extending substantially vertically from a rearward edge of the main body member; and (b) a set of spacers attached to an underside of the main body member to hold said main body member off the hood so as to create a shock absorbing air gap cushion area and to provide a flow path for rain water to drain from the hood.

16. The hood protective shield of claim 15 wherein the air foil member extends substantially vertically from about one inch to about three inches from the main body member.

17. The hood protective shield of claim 16 further having a catch ledge extending from the air foil member and sloping forwardly therefrom.

18. The hood protective shield of claim 15 wherein the lip member extends substantially fully across the main body member and further having a set of drain holes where said lip member and said main body member meet.

19. The hood protective shield of claim 18 wherein the lip member is J-shaped with a curved leg portion which engages the front edge of the hood and a substantially straight leg portion which extends along the underside of the hood from about one inch to about four inches.

20. The hood protective shield of claim 15 wherein the shield is from about fifteen mil to about fifty mil in thickness.

21. A hood and front fender protective shield capable of semi-permanent attachment to the hood of a motor vehicle for deflecting insects and road debris thrown towards the hood and front fender during travel, said protective shield comprising:

(a) a main body member of durable scratch-resistant material shaped to fit the contour of a front portion of the hood and dimensioned to extend substantially laterally across the hood and longitudinally from a front edge thereof to about four inches to about eighteen inches therefrom and having a set of wings, each said wing extending laterally from the main body member to cover a front portion of a fender, further wherein a lip member extends from the main body member to wrap around the front edge of the hood to engage an underside of said hod to snugly hold the protective shield article to the hood; and (b) a set of spacers attached to an underside of the main body member to hold said main body member off the hood so as to create a shock absorbing air gap cushion area and to provide a flow path for rain water to drain from the hood.

22. The hood protective shield of claim 21 wherein the lip member extends substantially fully across the main body member and further having a set of drain holes where said lip member and said main body member meet.

* * * * *